No. 715,533. Patented Dec. 9, 1902.
J. C. ANDERSON.
SPECTACLE FRAME.
(Application filed Sept. 20, 1902.)
(No Model.)
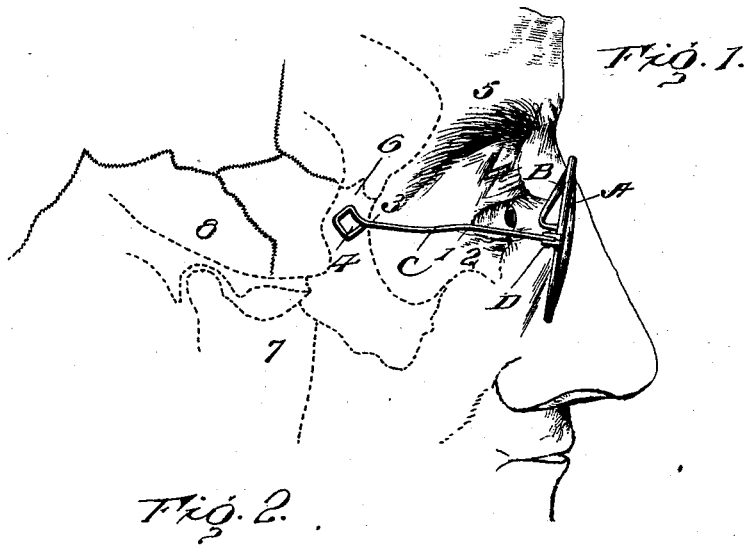

United States Patent Office.

JAMES C. ANDERSON, OF HIGHLAND PARK, ILLINOIS.

SPECTACLE-FRAME.

SPECIFICATION forming part of Letters Patent No. 715,533, dated December 9, 1902.

Application filed September 20, 1902. Serial No. 124,168. (No model.)

*To all whom it may concern:*

Be it known that I, JAMES C. ANDERSON, a citizen of the United States, residing at Highland Park, in the county of Lake and State of Illinois, have invented certain new and useful Improvements in Spectacle-Frames; and I do hereby declare the following to be a full, clear, and exact description of the invention, such as will enable others skilled in the art to which it appertains to make and use the same.

My invention relates to certain new and useful improvements in frames for eyeglasses.

It has for its object to provide a frame which shall be not only compact and capable of being folded within the boundary of that portion within which the lenses are confined, but which when extended and in use to support the glasses upon the wearer shall take bearing upon that part of the anatomy of the head where there is an absence of movement resulting from the articulation of the jaw-bones and at the same time not press upon any of the nerves, thus rendering the use of the glasses less objectionable than is the case with frames as ordinarily constructed.

With these ends in view my invention consists in the details of construction and arrangement hereinafter more fully set forth.

In order that those skilled in the art to which my invention appertains may know how to make the same and fully understand the advantages of my improved frame, I will proceed to describe the construction thereof and its adaptability to the anatomy of the head, referring by letters and figures to the accompanying drawings, in which—

Figure 1 is a side view or profile of a portion of a human head and showing my improved frame properly located for use, the dotted lines in the illustration of the head indicating so much of the bone anatomy as is required to particularly illustrate the predetermined proportions and construction of the "bows" of my improved frame and the advantages resulting therefrom. Fig. 2 is a top view of my improved frame with the bows in extended or open position, and Fig. 3 is a plan view with the bows folded down upon the lenses.

Similar characters of reference denote like parts in the several figures of the drawings.

A A are the lens-frames, and B the nose-bridge of any ordinary construction.

C C are my improved side bows secured to the lens-frames by the ordinary ruler-joint or hinge D, so that the outward movement of the bows is limited to a predetermined point. These bows are straight from the hinge-joint to the point 1, which is to be equal to the measured distance to the apex of the cheek-bone, as indicated at 2. From the point 1 to to 3 they are slightly curved, as best illustrated at Figs. 1 and 3, and the end is then fashioned into a substantially rectangular eye 4, with the upwardly-trending portion slightly curved, as shown, for the purpose presently explained. As shown at Fig. 2, that portion of the bow from the point 1 to 4 is curved slightly outward to conform to the gradual outward curve of the "frontal" bone 5, and the eye 4 is formed so as to rest in the correspondingly-shaped cavity existing between the front and rear boundaries of the "malar" 6, as shown at Fig. 1, and at a point unaffected by the articulation of the "mandible" 7 with the "squamous temporal" 8 and also away from the influence of the "squamous" and other "sutures" represented by the zigzag lines at Fig. 1. With this construction the nose-bridge B and bows C coöperate to hold the lens-frames in proper relation to the eyes of the wearer, and as the eyes 4 at the extremities of the bows C rest behind the front ridge of the malar bone 6 and are in a position to be entirely unaffected by the articulation of the bones or the movements of the sutures it will be apparent that no appreciable inward pressure of the ends of the bows is necessary in order to maintain the frame in proper position, and hence no inconvenience is experienced by the wearer.

The bows C are made of substantially uniform length, and any slight variation in the bone formations of various persons may be readily compensated for by slightly varying the extent of the curvatures from 1 to 3 and 1 to 4, hereinbefore referred to, so that in every case the eyes 4 of said bows may be located in the depression or slight cavity in the malar 6.

I am aware that it is not new to construct eyeglass-frames with a hinged or articulated nose-bridge and comparatively short bows provided with cups adapted to rest upon the temples; but in this construction the joint in the nose-bridge precludes the proper coöperation of the same and the ends of the bows to properly maintain the frame in position, and the bows are not constructed with special reference to the bone anatomy of the head, but, on the contrary, terminate and press at a locality where they are subjected to the influence of articulative motions and depend for security of position upon undue and irritating pressure upon the temples, where extreme sensitiveness prevails.

What I claim as new, and desire to secure by Letters Patent, is—

1. An improved eyeglass or spectacle frame, consisting of the lens-frames rigidly connected by a nose-bridge, and side bows hinged to the lens-frames by a joint of limited movement, said bows curved to conform to the convexity of the frontal bone and provided at their free ends with substantially rectangular eyes at such predetermined distance from the hinge-joint as to rest, when in use, in the cavity existing between the front and rear boundaries of the "malar" bone of the skull, substantially as hereinbefore set forth.

2. In a spectacle-frame such as described, the bows connected with the lens-frame by a joint of limited articulation and formed at their free ends with eyes adapted to rest in the cavity between the front and rear boundaries of the malar bone of the skull and having the upwardly-trending side of said eyes curved inwardly, substantially as hereinbefore set forth.

In testimony whereof I affix my signature in presence of two witnesses.

JAMES C. ANDERSON.

Witnesses:
   D. L. GETT,
   L. M. GOTWALD.